United States Patent [19]
Diehl et al.

[11] Patent Number: 5,563,948
[45] Date of Patent: Oct. 8, 1996

[54] PROCESS FOR AUTHENTICATION OF SMART CARDS, AND DEVICE FOR USE OF THE PROCESS

[75] Inventors: Eric Diehl, Neudorf; Joël Hamon, Lipsheim; Michel Leduc, Boersch, all of France

[73] Assignee: Laboratoire Europeen De Recherches Electroniques Avancees, Societe En Nom Collectif, Courbevoie, France

[21] Appl. No.: 127,092

[22] Filed: Sep. 27, 1993

Related U.S. Application Data

[63] Continuation of Ser. No. 914,631, Jul. 17, 1992, abandoned, which is a continuation of Ser. No. 803,779, Dec. 6, 1991, abandoned, which is a continuation of Ser. No. 606,860, Oct. 31, 1990, abandoned.

[30] Foreign Application Priority Data

Nov. 8, 1989 [FR] France ............... 89 14639

[51] Int. Cl.$^6$ .......................................... H04N 7/167
[52] U.S. Cl. ................................... 380/16; 380/20
[58] Field of Search ..................... 235/380; 380/16, 380/20, 23–25

[56] References Cited

U.S. PATENT DOCUMENTS

| | | |
|---|---|---|
| 4,599,647 | 7/1986 | George et al. |
| 4,751,732 | 6/1988 | Kamitake ............... 380/20 |
| 4,935,962 | 6/1990 | Austin ................... 380/25 |
| 4,968,873 | 11/1990 | Dethloff et al. ........ 235/380 |
| 4,985,920 | 1/1991 | Seki ...................... 380/23 |

FOREIGN PATENT DOCUMENTS

| | | |
|---|---|---|
| 0019286 | 11/1980 | European Pat. Off. |
| 0284133 | 9/1988 | European Pat. Off. |
| 0294248 | 12/1988 | European Pat. Off. |
| 0311470 | 4/1989 | European Pat. Off. |
| 0325238 | 7/1989 | European Pat. Off. |
| WO8500718 | 2/1985 | WIPO |

Primary Examiner—Stephen C. Buczinski
Attorney, Agent, or Firm—Oblon, Spivak, McClelland, Maier & Neustadt, P.C.

[57] ABSTRACT

The device of the invention for a pay-television system comprises an emitter and several receivers using "smart cards". In addition to the unscrambling control signals, the emitter sends encrypted authentication messages to which a correct response can be given only by the receivers where valid cards are used.

17 Claims, 2 Drawing Sheets

PROCESS FOR AUTHENTICATION OF SMART CARDS, AND DEVICE FOR USE OF THE PROCESS

This application is a Continuation of application Ser. No. 07/914,631, filed on Jul. 17, 1992, now abandoned, which is a continuation of Ser. No. 07/803,779, filed Dec. 6, 1991, which is a continuation of 07/606,860 filed Oct. 31, 1990, all abandoned.

BACKGROUND OF THE INVENTION

The present invention concerns a process for authentication of a smart card and a system for use of the process.

In a pay-television network, such as that described by the French patent applications nos. 88 06121 and 87 17092, corresponding to U.S. Application Ser. No. 07/811,906 the subscribers' decoders, in order to unscramble coded broadcasts, require so-called "smart cards". To limit the risks of fraudulent use, it can be arranged to change these cards at intervals, for example every three months, "invalidating" the expiring cards by sending an appropriate signal to a given input of the card. However, these networks are not intended to detect the use of counterfeit cards or card simulators.

The FIG. 1 shows the block diagram of the pay television program scrambler according to U.S. patent application Ser. No. 811,906. The transmitter and the television receiver 1 are briefly described as most of these items are well known per se.

The transmitter 1 comprises a source 2 of images supplying composite video signals. Its output is connected via an analog-digital converter 3 to an intermediate video scrambler circuit 4 of a type which is known per se. This circuit 4 is controlled by a control unit 5 via a pseudo-random sequence generator 6, and it sends to this central unit synchronization signals corresponding to the video signals. The circuit 4 is connected via a digital-analog converter 7 to a power transmitter 8 whose transmitting antenna is referenced 9.

In FIG. 1, there has been shown the block diagram of that one of the television receivers which is able to receive the transmissions from the transmitter 1 and provided with unscrambling circuits. This receiver is referenced 10. The receiver 10 comprises a receiving antenna 11 connected to a tuner 12 followed by an analog-digital converter 13, a digital video unscrambling circuit 14, and a digital/analog convertor 15 at the output 16 of which the unscrambled video signals are taken.

The output of the circuit 12 is also connected, via an amplifier 17, a filter 18 and a peak value detector 19, to the serial input of a shift register 20. The parallel outputs of the register 20 are connected, via a buffer register 21, to the data inputs of a microprocessor computer 22, for example a microprocessor of the EF6805 type.

The computer 22 is connected in a bidirectional manner to a security code checker 23. This checker 23 is connected to a "smart card" reader 24. The computer 22 is also connected to a pseudo-random sequence generator 25 which is itself connected to the circuit 14.

In the transmitter 1, the video signals coming from the source 2 and digitized by the converter 3 are scrambled in the circuit 4 under the control of pseudo-random sequences of signals produced by the generator 6. Each of the successive binary numbers of a sequence appearing in synchronism with the successive lines of the video signal determines a break point in the corresponding line, this break point being able to be located at any position in the line. The scrambling consists in permutating the sections of the line situated on either side of this break point. This scrambling method, called "scrambling by line permutation", being well known per se, will not be described in greater detail.

The sequences of the pseudo-random generator 6 have a relatively short cycle: 2.56, 5.12 or 10.24 seconds. The 2.56 s cycle is particularly advantageous for limiting the lock-on time of the decoder on switching on. The different values of sequences mentioned above are selected dynamically in the transmitter. These sequences are controlled by the control unit 5 as a function of an access to the program message, here called the ECM (Entitlement Checking Message), common to all the receivers. In some other pay television systems, the authorization messages are communicated to subscribers by post, by modem or by any other telecommunications means. The access messages can therefore be modified only at relatively long time intervals (usually a few weeks), which allows "pirates" to discover them (it is estimated that these messages can be discovered in 1 to 2 days) well before their next modification.

According to the disclosure of the application 811,906, the control unit 5 of the transmitter inserts access messages in the composite video (at the input of the converter 7). This central processing unit 5 (sic) provides, among other things, an image counter function (FCNT). This counter is incremented by unity every other frame, that is to say at each complete image (every 40 ms for a 50 Hz interlaced frame standard), using the image sync pulses of the video signal sent by the circuit 4. In the present case, this counter has a maximum count state of 255 (8-bit counter). After having reached this maximum state, the counter returns to zero, and allows the synchronization of control words (CW) whose encoded version is the said access message. This control word can, for example, have a length of 60 bits and it is chosen in a random manner. This control word determines a new cycle of the generator 6. Furthermore, the control unit 5 sends to the circuit 7, at specific instants, the following data: the state of the counter (FCNT), access message headers (H1 and H2), data concerning the state of the transmission system (scrambled or not scrambled, free access or pay access, message data rate), and check data ("check num" or CRC, for example). The central unit sends these data during the transmission of lines which are not used by the image. According to the CCETT 625-line standard, there are lines which are not used by the visible image before the 23rd and after the 310th line. In the present example, four of these lines not used by the image are used for the encoding, for example the lines 12 to 15 for a field F1 and the lines 325 to 328 for a field F2. At each of these lines, during the useful duration of the line, the central processing unit sends five bytes of encoding data, that is 40 bits per line and 20 bytes for each field of four lines. The binary zeros correspond to the black level and the "1"'s correspond to the white level. Thus at the start of each complete image (every 40 ms in the above-mentioned example), a data packet (of 40 bytes) is incorporated in the composite video signal transmitted by the transmitter 1.

Two different types of data packets are transmitted: ECM1 and ECM2. Advantageously, these data packets are encoded, for example, in 8-4 Hamming code, in order to be better protected from transmission interference. According to a variant, the different bytes of each packet can be interlaced within that packet in order to improve immunity from interference. They are all, of course, correspondingly de-interlaced in each decoder.

SUMMARY OF THE INVENTION

The object of the present invention is a process preventing counterfeit or simulated cards from being used, and preventing smart cards from being re-used after the end of their period of validity, in a system comprising at least one management center and at least one terminal connected to it.

Another object of the present invention is a device for the use of this process, a simple device requiring no major changes of the equipment already used on which it may be installed.

The process according to the invention consists in making the cards of each terminal, during at least part of the time during which a card is inserted, perform at least one authentication operation. The authentication operation preferably includes at least two different combinative operations, based on a number chosen at random by the cards and/or a secret number memorized in the cards. If a card's response is incorrect, the card reader prevents the use of the card.

The device for use of the process of the invention is of the type comprising at least one management center connected to at least one terminal with at least one device for reading smart cards, and according to the invention the card reader possesses means of controlling the production of authentication signals, means of analysis of the response of the cards placed in the reading device and means of controlling the disablement and/or invalidation of cards. The management center includes means of producing messages controlling authentication operations.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

The invention is described below with reference to a pay-television network, but it is understood that it can be used in many other systems including at least one center of management and/or control and/or distribution of goods or various paid services, here called simply "management center", connected by wires or radio links to one or more pieces of equipment accessible to users or subscribers using smart cards to obtain these services. As examples, we could mention a banking system, a gasoline distribution network, a network of recording cash tills in shops selling a variety of products or a system for the surveillance of movements of goods and/or persons.

Figure 2:
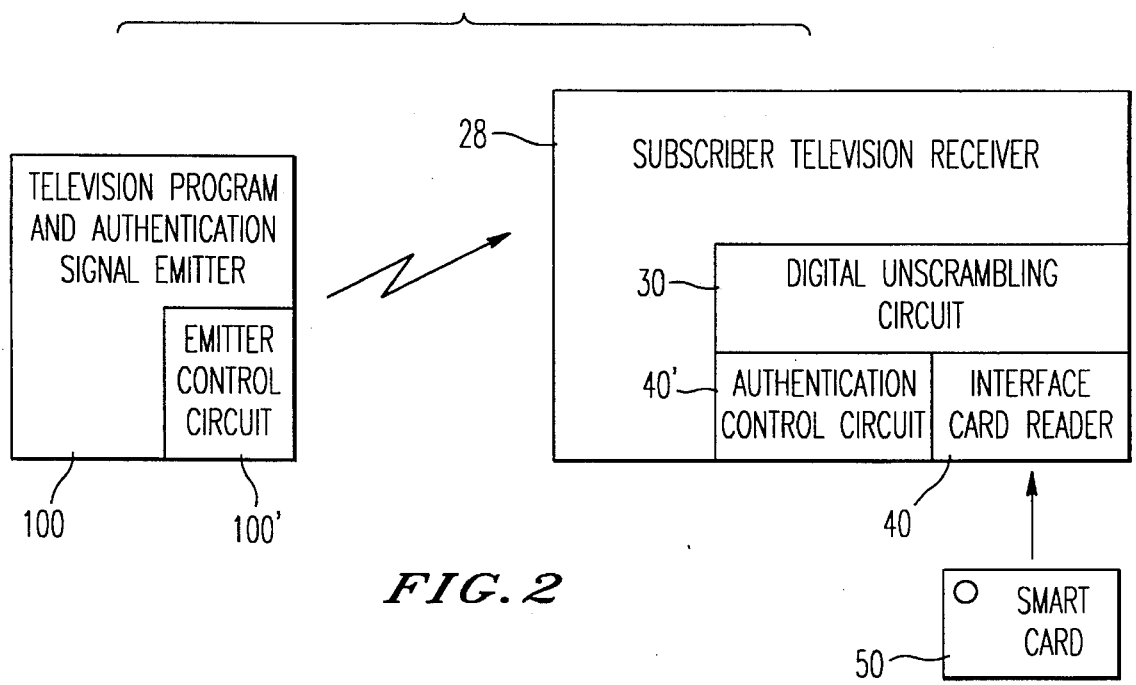
FIG. 2 is a block diagram of a system according to the present invention including an authentication device for a smart card system.

To simplify the explanations, only one subscriber television receiver 28 has been represented in the FIG. 2 in addition to the television program emitter 100. The emitter 100 broadcasts coded programs for at least part of the time.

Figure 1:
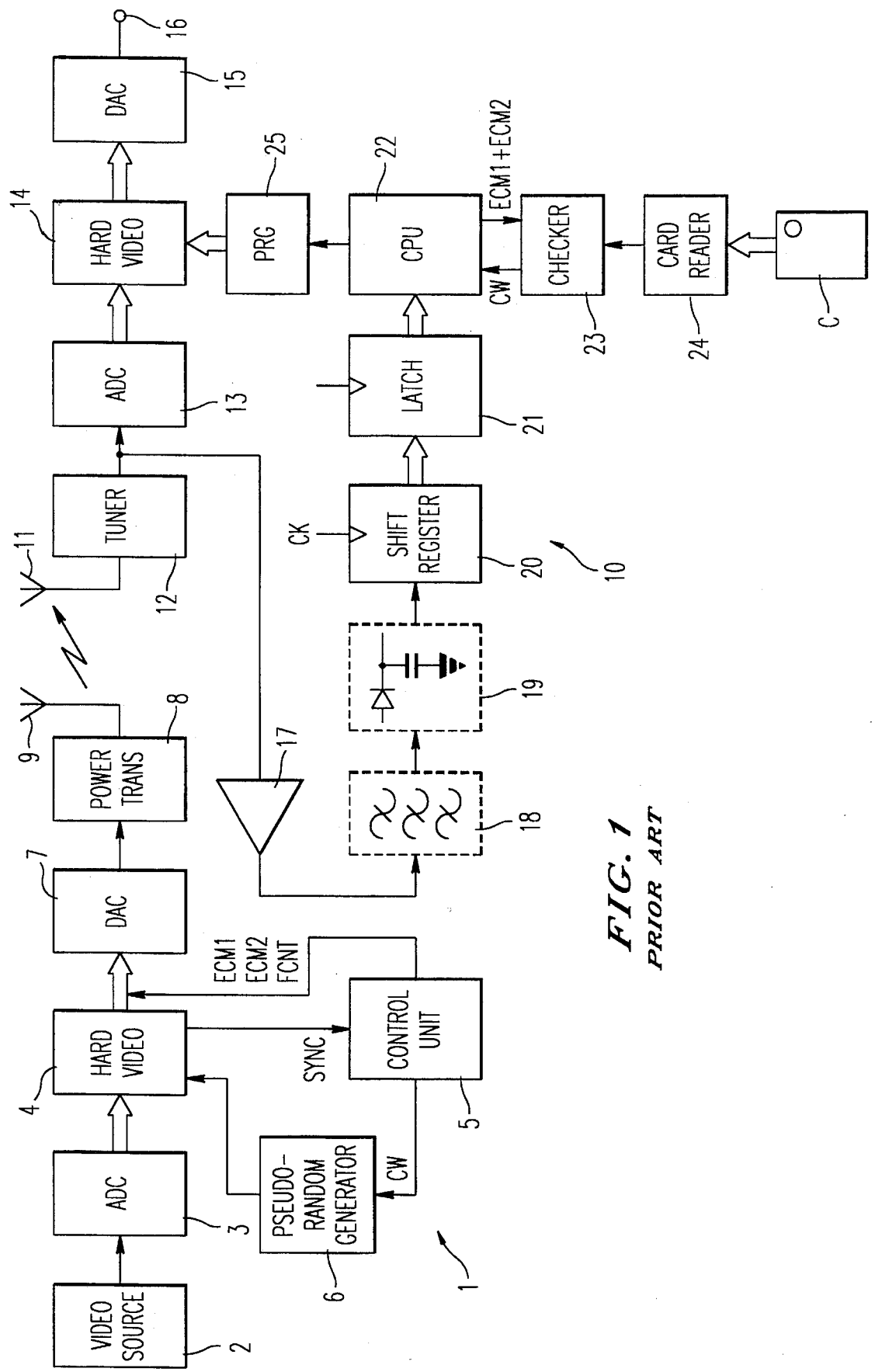
FIG. 1 is an example of a pay television network using decoders for unscrambling coded broadcast and requiring "smart cards" as described in U.S. patent application Ser. No. 811,906.

The receiver 28 includes in its video channel (not shown in detail), a digital unscrambling circuit 30, for example such as that described in FIG. 1 and in U.S. patent application 07/811,906.

The circuit 30 of FIG. 2 is connected to an interface circuit 40 cooperating with a smart card 50 or a smart card with "tokens" (pre-charged card with a number of connections, each corresponding to a "pay-per-view" program credit which are burnt out as the card is used).

As specified in the above-mentioned patent application, the emitter 100 broadcasts, in addition to the programs, data enabling these programs to be unscrambled if they are scrambled on emission. The card 50 enables these programs to be unscrambled, for example in the way described in the above-mentioned U.S. patent application.

According to the invention and as shown in FIG. 2, the emitter 100, controlled by a circuit 100', broadcasts authentication messages in addition to the unscrambling data and preferably independently of these data. These authentication messages are preferably coded in any appropriate way. In its protected section the card 50 possesses data enabling these messages to be decoded and responded to, in addition to the data enabling the programs to be unscrambled.

Of course, the secret "signature" data of each card are unique and known only to the management center, it being impossible for two cards to have the same "signature".

The messages broadcast, preferably irregularly, by the emitter 100 are coded and preferably mixed with service data. According to a preferential mode of embodiment, these messages command a circuit 40' of the card reader 40 to make the card 50 perform at least two different combinative operations.

The card 50 includes in a zone of its memory, to which external access is inhibited, in particular two sorts of data: its identity ID, which is not necessarily secret, and at least a very long secret number S (e.g. several hundred bits), which represents its "signature".

The identity ID can preferably serve to disable counterfeit cards. It is almost certain that counterfeit cards are all identical with a valid card and therefore all have the same identity. A member of the management center personnel can buy suspect cards from one or more retailers and test their authenticity, which is a simple matter since the manufacturer of the cards communicates the data memorized in the cards to the management center. If the test reveals that the cards are counterfeit, the management center can simply send invalidation signals to the cards with this identity.

The combinative operations performed by the cards of a network are based on statistical concepts, and the law of large numbers, ensuring "zero knowledge" of the secret number S. One can refer for example to the article by Goldwasser, Micali and Rackoff: "The Knowledge Complexity of Interactive Proof Systems", 17th ACM Symposium on Theory of Computation, May 1985, and to the article by A. Shamir: "Identity-Based Cryptosystems and Signature Schemes", Proceedings of Crypto'84, notes in Computer Science no. 186 (ed: Springer, 1985).

For this purpose, the card 50 never communicates the value S to the card reader but either a number obtained (for example by raising to the square) from a number chosen at random by the card, or a number resulting from the combination of S with a randomly-chosen number. The emitter 100 randomly asks the card reader 40 to make the card 50 perform either a calculation based on the number obtained from a randomly-chosen number to find this chosen number (extraction of a square root, for the example given above), or a combination of the randomly-chosen number with the number S. Thus, the card 50 never communicates the secret number S to the reader 40, but numbers from which it is extremely difficult to find S, particularly if the operations are performed by the card within a short period of time.

To increase security, it can be arranged that the card 50 is definitively invalidated at the first incorrect result (physical disablement). It is also possible to have displayed at the receiver 28, for example on the screen of this receiver, an indication that the card is invalid. Of course, the card reader must then include means of preventing any "pirate" from blocking a signal invalidating the card, for example such as those described in Patent Application 89 14417 by the Applicant.

It can also be arranged that the emitter 100 randomly sends decoy messages to the different receivers, i.e. messages which do not command any operation for the cards or which command dummy operations.

What is claimed is:

1. A method of preventing unauthorized use of a pay television system having a central station for transmitting at least a scrambled television signal and at least one remote television receiver, including a descrambling circuit, for viewing the television signal, the method comprising the steps of:

providing the at least one remote television receiver with a smart card for receiving an enabling signal from the central station to enable the descrambling circuit to descramble the scrambled television signal;

providing the at least one smart card with authentication data, unique thereto, for responding to an authentication message from the central station, to authenticate that the smart card is authorized for use; and independently transmitting, from the central station, the enabling signal and the authentication message to the smart card at the at least one remote television receiver.

2. A method according to claim 1, wherein the authentication data includes identity data and signature data which is unique to the smart card and secret.

3. A method according to claim 1, further comprising the step of inhibiting operation of the at least one television terminal if the authentication data is incorrect.

4. A method according to claim 1, further comprising the step of invalidating the smart card of the at least one television terminal if the authentication data is incorrect.

5. A method according to claim 1, further comprising the step of displaying an indication that the smart card is invalid at the at least one television terminal if the authentication data is incorrect.

6. A method according to claim 1 further comprising the step of transmitting, from the central station, decoy authentication messages.

7. A device for preventing unauthorized use of a pay television system having a central station for transmitting at least a scrambled television signal and at least one remote television receiver, including a descrambling circuit, for viewing the television signal, the device comprising:

a smart card containing authentication data, to be provided at the at least one remote television receiver, for receiving an enabling signal from the central station to enable the descrambling circuit to descramble the scrambled television signal;

means for connecting the smart card to the descrambling circuit and the central station;

authentication means for responding to an authentication message received from the central station, to authenticate that the smart card is authorized for use; and means for independently transmitting, from the central station, the enabling signal and the authentication message to the smart card provided at the at least one remote television receiver.

8. A device according to claim 7, wherein the authentication data of the authentication means includes identity data and signature data which is secret and unique to the smart card.

9. A device according to claim 7, further comprising inhibiting means for inhibiting operation of the at least one television terminal if the authentication data is incorrect.

10. A device according to claim 7, further comprising invalidating means for invalidating the smart card at the at least one television terminal if the authentication data is incorrect.

11. A device according to claim 7, further comprising means for displaying an indication that the smart card is invalid at the at least one television terminal if the authentication data is incorrect.

12. A device according to claim 7, wherein the transmitting means transmits, from the central station, decoy authentication messages.

13. A device according to claim 7, further including means for preventing blockage of the authentication message from the central station.

14. A method for preventing the unauthorized use of at least one smart card in a television broadcast system having a central station for broadcasting and at least one remote receiver for receiving said broadcast, the method comprising the steps of:

inserting said at least one smart card into said at least one remote receiver, transmitting, from the central station, an authentication message to said at least one remote receiver, receiving said authentication message at said remote receiver, triggering, in response to said authentication message, an authentication process of said smart card by said remote receiver.

15. A method according to claim 14, further comprising the step of inhibiting operation of said at least one remote receiver if said at least one smart card is not proven to be authentic.

16. A method according to claim 14, further comprising the step of displaying an indication that the smart card is invalid at the at least one television terminal if the said at least one smart card is not proven to be authentic.

17. A method according to claim 14, wherein said authentication process comprises a zero knowledge type algorithm.

* * * * *